(12) United States Patent
Hsiao et al.

(10) Patent No.: US 9,390,124 B2
(45) Date of Patent: Jul. 12, 2016

(54) VERSION CONTROL SYSTEM USING COMMIT MANIFEST DATABASE TABLES

(71) Applicant: Microsoft Corporation, Redmond, WA (US)

(72) Inventors: Andrew Hsiao, Raleigh, NC (US); Kevin Resnick, Apex, NC (US); Bryan MacFarlane, Wake Forest, NC (US); Taylor Lafrinere, Cary, NC (US)

(73) Assignee: MICROSOFT TECHNOLOGY LICENSING, LLC., Redmond, WA (US)

( * ) Notice: Subject to any disclaimer, the term of this patent is extended or adjusted under 35 U.S.C. 154(b) by 624 days.

(21) Appl. No.: 13/831,893

(22) Filed: Mar. 15, 2013

(65) Prior Publication Data

US 2014/0279903 A1 Sep. 18, 2014

(51) Int. Cl.
*G06F 17/30* (2006.01)

(52) U.S. Cl.
CPC .... *G06F 17/30377* (2013.01); *G06F 17/30292* (2013.01); *G06F 17/30309* (2013.01)

(58) Field of Classification Search
CPC .................. G06F 17/30235; G06F 17/30533; G06F 17/30309; G06F 17/30292
USPC .......................................... 707/792, 695, 638
See application file for complete search history.

(56) References Cited

U.S. PATENT DOCUMENTS

| | | | | |
|---|---|---|---|---|
| 6,457,065 B1* | 9/2002 | Rich | ........................ | G06F 9/466 707/E17.005 |
| 7,580,918 B2 | 8/2009 | Chang et al. | | |
| 7,933,749 B2* | 4/2011 | Chang | ................... | G06K 9/6211 382/154 |
| 8,195,621 B2* | 6/2012 | Elisha | .................. | G06F 17/3051 707/626 |
| 8,458,657 B2* | 6/2013 | Bush | ....................... | G06Q 10/06 717/120 |
| 8,918,429 B2* | 12/2014 | Stanev | .............. | G06F 17/30309 707/695 |
| 9,096,792 B2* | 8/2015 | Zhou | ................... | C09K 11/0883 |
| 2002/0004710 A1 | 1/2002 | Murao | | |
| 2004/0073581 A1* | 4/2004 | McVoy | ...................... | G06F 8/71 |
| 2006/0282479 A1* | 12/2006 | Johnson | ..................... | G06F 8/65 |
| 2007/0136382 A1* | 6/2007 | Idicula | .............. | G06F 17/30235 |
| 2009/0157723 A1 | 6/2009 | De Peuter et al. | | |
| 2010/0325613 A1* | 12/2010 | Bush | ....................... | G06Q 10/06 717/120 |
| 2012/0174066 A1* | 7/2012 | Bush | ....................... | G06Q 10/06 717/122 |

OTHER PUBLICATIONS

Quaranto, Nick., "Git Ready", Retrieved at <<http://gitready.com/intermediate/2009/01/30/finding-what-has-been-changed.html>>, Jan. 30, 2009, pp. 4.

"Creating, Adding, and Committing: Git Basics", Retrieved at <<http://media.pragprog.com/titles/tsgit/chap-005-extract.html>>, Retrieved Date: Feb. 9, 2013, pp. 5.

"Model Tree Structures with an Array of Ancestors", Retrieved at <<http://docs.mongodb.org/manual/tutorial/model-tree-structures-with-ancestors-array/>>, Retrieved Date: Feb. 9, 2013, p. 1.

"Accessing Contract Repository Objects", Retrieved at <<http://docs.oracle.com/cd/E13203_01/tuxedo/build21/cplus/mainw1.htm>>, Retrieved Date: Feb. 9, 2013, pp. 6.

\* cited by examiner

*Primary Examiner* — Jean M Corrielus (74) *Attorney, Agent, or Firm* — Kevin Sullivan; Kate Drakos; Micky Minhas (57) ABSTRACT

A centralized version control system stores and tracks commits as a set of database tables in a central repository that may be shared by others. A commit represents a version of a repository of files at a given point in time. The centralized version control system allows users to query for information relating to the history of the commits. The queries are implemented through operations performed on database tables using a database query language. The configuration of the database tables in this manner enables the system to process the queries more readily.

19 Claims, 9 Drawing Sheets

VERSION CONTROL SYSTEM USING COMMIT MANIFEST DATABASE TABLES

BACKGROUND

A version control system tracks changes made to a repository of files over time. The repository of files may be associated with a project having multiple files that may be accessed by different users independently. The version control system tracks changes made to a repository of files in the project in order to provide the ability to revert back to a prior version of a file or to ascertain information pertaining to the changes made to the repository.

A version control system is useful in software development projects that have several developers collaborating in the development independently and in different geographic locations. A repository of files may be distributed to multiple developers who edit the files independently. The version control system provides a mechanism to track the changes made to the files in the repository over time, the ownership of the changes, and the history of all the changes made.

Version control systems may use directed acyclic graphs (DAGs) to track the different versions of the repository and information pertaining to the changes made with each version. A DAG has an inherent hierarchical ordering which is similar to the hierarchical structure of a file system. This makes the DAG a natural choice for representing the repository. Queries relating to the version history of a repository use tree traversal techniques to traverse the DAG to obtain the data needed to formulate a response to the query. However, a DAG representing a large repository may contain a large number of nodes thereby consuming a considerable amount of computing time to traverse the DAG to obtain the information needed to answer the query.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A centralized version control system operates as a public repository for a repository of files that may be shared by others. The repositories are distributed to users through client machines having a local version control system that maintains and tracks versions of the repository on the client machine. The local version control system differs from the centralized version control system. A user on a client machine pushes the commits made on the local repository to the centralized version control system. The centralized version control system uses a set of database tables to store the commits made to the repository. The centralized version control system receives queries from the users to obtain information about the various versions of the repository and changes made with each version.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

Various embodiments pertain to a centralized version control system that maintains and tracks multiple versions of a repository of files in a central location. The repository may be copied to users who work on the files in the repository independently. A commit representing the state of the repository at a point in time are pushed to the centralized version control system so that the files in the commit are stored in a public repository that may be shared by others. The centralized version control system uses a set of database tables to store the information processed from a commit. The use of the database tables to store the information from the commits enables the centralized version control system to perform subsequent queries without performing computationally intensive tree traversals.

Figure 1:
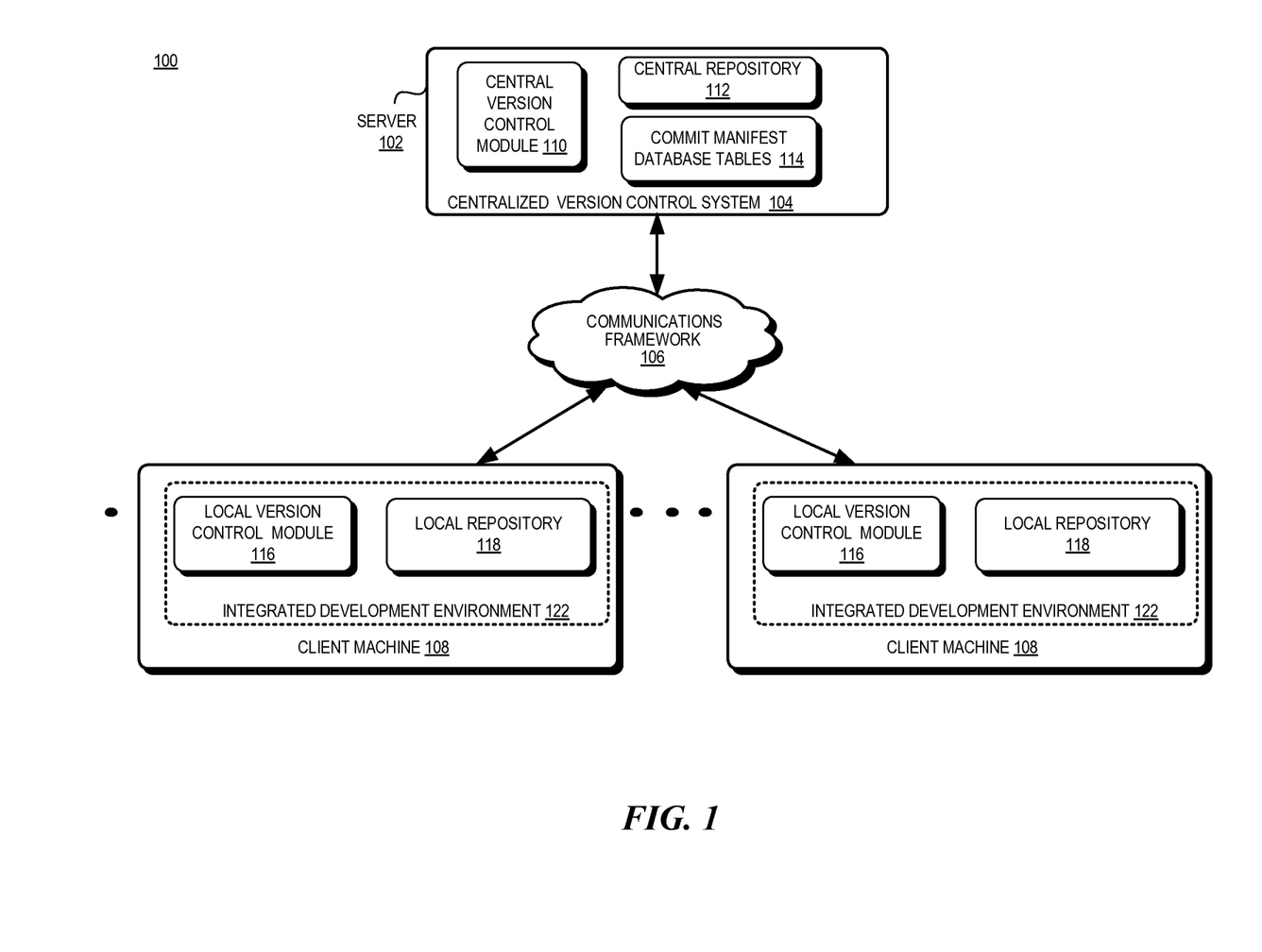
FIG. 1 is a block diagram illustrating an exemplary system utilizing a centralized version control system using database tables to maintain and track commits

Attention now turns to a discussion of a system in which embodiments may be implemented. FIG. 1 illustrates a system 100 that may include a server 102 embodying a centralized version control system 104, a communications framework 106, and one or more client machines 108. The centralized version control system 104 may include a central version control module 110, a central repository 112, and a set of commit manifest database tables 114. Each client machine 108 may include a local version control module 116 and a local repository 118. The local repository 118 includes one or more directories of files and metadata. The metadata includes the commits made to the local repository on the client machine 108.

The local version control module 116 implements a local version control system that tracks changes made to the local repository 118. In one or more embodiments, the local version control module 116 may be implemented as a distributed version control system, such as the Global Information Tracker (GIT). However, it should be noted that the embodiments are not constrained to GIT and that other distributed version control systems, such as BitKeeper, Mercurial, Bazaar, or Dares, may be used.

Each client machine 108 has a copy of the full repository. A repository is a group of files designated for version control. The files may be part of a software development project, collaborative effort, or all the files located in a particular directory on the client machine 108. A developer, using the client machine 108, may select the files to be considered as the repository or receives the repository from another source, such as server 102.

The local version control module 116 represents a series of commits as a DAG. A DAG is a directed acyclic graph having several nodes and edges and no loops. Each node represents a commit and each edge connects two nodes and forms a parental relationship between the connected nodes. Each commit node contains a subtree representing the structure of the repository at the time the commit was made. The nodes in the subtree may represent a file or folder in the repository. All routes in the DAG end at a single terminal node.

In one or more embodiments, the local version control module 116 and the local repository 118 may be part of an integrated development environment 122. An integrated development environment 122 is a collection of tools (e.g., compilers, editors, debuggers, etc.) used to develop software applications. In one or more embodiments, the integrated development environment 122 may be Microsoft's VISUAL STUDIO®. The placement of a local version control module 116 within an integrated development environment 122 provides a developer with the capability of tracking changes made to a file or file directory as the underlying software project is being developed.

The centralized version control system 104 stores the content of each version of a repository of files. The centralized version control system 104 has the benefit of being in a centralized location which can maintain a synchronized copy of a repository that may be shared with others. The centralized version control system 104 is managed by a central version control module 110. The central version control module 110 tracks each version of the central repository 112 through a set of commit manifest database tables 114. In one or more embodiments, the database tables 114 may be a set of relational database files managed by a relational database management system, such as a SQL server. A relational database is a set of data items that are configured in tables. A relational database uses a sequential query language (SQL) to interact with the database tables to obtain information about the data in the database tables.

The communications framework 106 may be any type of communications link capable of facilitating communications between the client machines 108 and the server 102, utilizing any type of communications protocol and in any configuration, such as without limitation, a wired network, wireless network, or combination thereof. It will be appreciated that the network connections shown are exemplary and other means of establishing a communications link between the client machines 108 and the server 102 may be used as well.

The server 102 and the client machines 108 may be any type of electronic device capable of executing programmable instructions such as, without limitation, a mobile device, a personal digital assistant, a mobile computing device, a smart phone, a cellular telephone, a handheld computer, a server, a server array or server farm, a web server, a network server, an Internet server, a work station, a mini-computer, a mainframe computer, a supercomputer, a network appliance, a web appliance, a distributed computing system, multiprocessor systems, or combination thereof.

In one or more embodiments, the central version control module 110 may be a sequence of computer program instructions, that when executed by a processor, causes the processor to perform methods and/or operations in accordance with a prescribed task. The central version control module 110 may be implemented as program code, programs, procedures, module, code segments, program stacks, middleware, firmware, methods, routines, and so on. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language.

In various embodiments, the system 100 described herein may comprise a computer-implemented system having multiple elements, programs, procedures, modules, such as without limitation, a mobile device, a personal digital assistant, a mobile computing device, a smart phone, a cellular telephone, a handheld computer, a server, a server array or server farm, a web server, a network server, an Internet server, a tablet, a work station, a mini-computer, a mainframe computer, a supercomputer, a network appliance, a web appliance, a distributed computing system, multiprocessor systems, or combination thereof. The elements of the system may be implemented in hardware, a combination of hardware and software, or software. For example, an element may be implemented as a process running on a processor, a hard disk drive, multiple storage drives (of optical and/or magnetic storage medium), an object, an executable, a thread of execution, a program, and/or a computer. One or more elements may reside within a process and/or thread of execution, and an element may be localized on one computer and/or distributed between two or more computers as desired for a given implementation. The embodiments are not limited in this manner.

Although the system 100 as shown in FIG. 1 has a limited number of elements in a certain configuration, it may be appreciated that the system 100 may include more or less elements in alternate configurations as desired for a given implementation. For example, the server 102 may be part of a service comprising several servers. There may be a SQL server hosting the commit manifest database tables 114, another server hosting the central version control module 110, and another server hosting the central repository 112. Other configurations of the servers in the service are possible and the embodiments are not limited in this manner.

Attention now turns to a discussion of GIT, the local version control module. In FIGS. 2A-2D, a developer initiates a sequence of commit commands at different time points which results in a corresponding DAG that represents the commit and the sequence of commits.

Figure 2A:
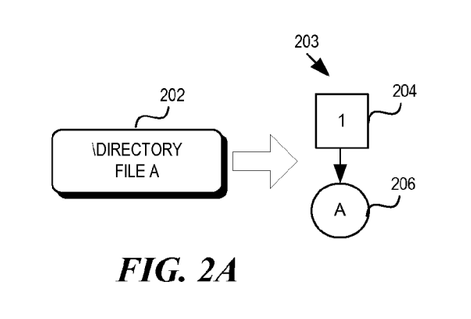
FIGS. 2A-2D are block diagrams showing exemplary illustrations of different versions of a repository.

FIG. 2A shows an exemplary repository 202 having a single file A. The repository 202 is represented by DAG 203. DAG 203 has a commit node 204, referred to as commit node 1, and a subtree including child node 206 representing file A.

Figure 2B:
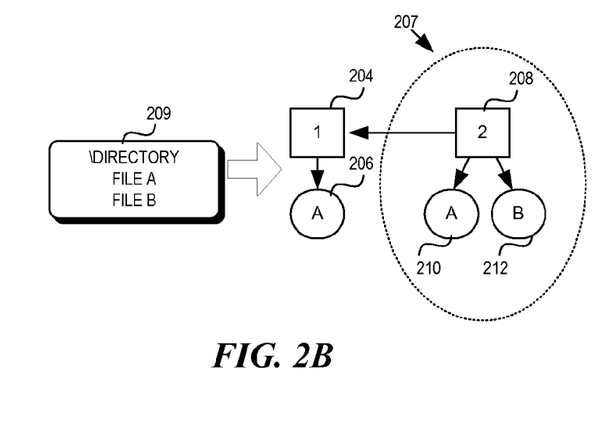

FIG. 2B shows an exemplary repository 209 having files A and B. Repository 209 is a subsequent version of the repository shown in FIG. 2A. This version of the repository is represented by DAG 207. DAG 207 has commit node 2 and a subtree containing two child nodes 210, 212. Commit node 1, 204, is the parent of commit node 2 since it is committed at an earlier time than commit node 2, 208. Child node 210 represents file A and child node 212 represents file B.

Figure 2C:
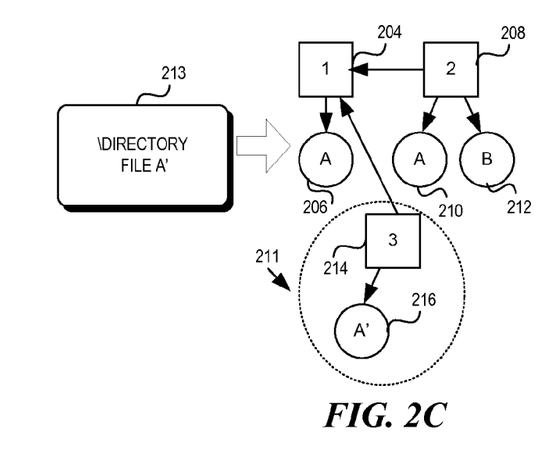

FIG. 2C shows an exemplary repository 213 having a single file A'. Repository 213 is also a subsequent version of the repository shown in FIG. 2A. File A' is an edited version of file A which the developer changed. The branch that includes commit nodes 1 and 2 is considered the master branch. The master branch is the default branch. Commit node 3 represents a version of file A that has been changed, A', 216. Commit node 1 is the parent of commit node 3. Commit node 3 is in a development branch from commit node 1 since the developer is currently working on file A. DAG 211 represents commit node 3, 214, having a subtree with child node 216 representing file A'.

Figure 2D:
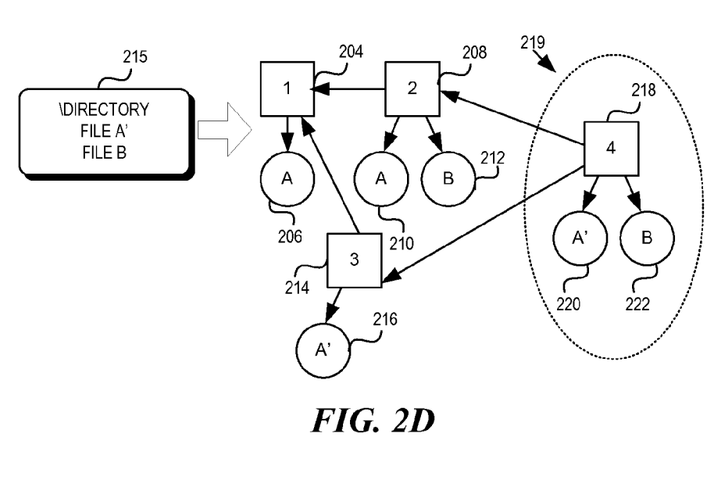

FIG. 2D shows the development branch merged into the master branch. This is typically performed when the developer has completed working with all the files in the development branch. As shown in FIG. 2D, this version of the repository 215 is represented by DAG 219. Repository 215 is a subsequent version of the repository shown in FIG. 2C. DAG 219 shows commit node 4 having a subtree including two child nodes, node 220 representing A' and node 222 representing B. Commit node 4 represents the final version of the repository which includes files A' and B.

Figure 3:
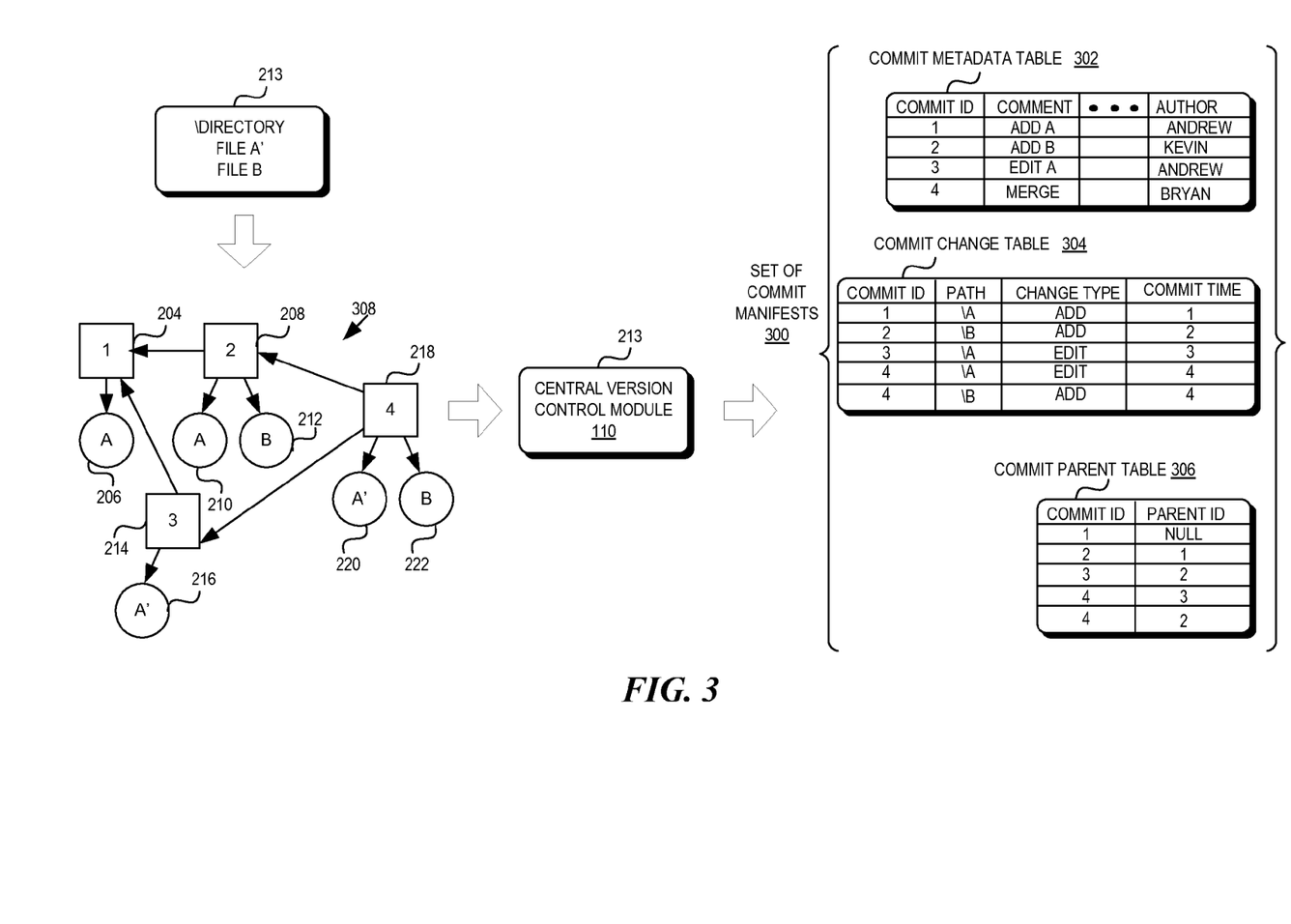
FIG. 3 is a block diagram illustrating an exemplary commit manifest formatted into several database tables.

FIG. 3 shows the repository shown in FIG. 2D transformed through a transformation process implemented by central version control module 110 into a set of commit manifest database tables 300. A commit manifest is a list of changes made between two commits A repository may be represented by a set of commit manifests showing a sequence of changes made over time. A version of a repository may be represented by a particular set of commit manifests that contain all the changes made to a repository.

Turning to FIG. 3, there is shown the repository 213 of FIG. 2D represented by DAG 308, transformed, via the central version control module 110, into a set of commit manifest tables 300. The set of commit manifest tables 300 may be represented as a set of three database tables: a commit metadata table, 302; a commit change table 304; and a commit parent table, 306. However, it should be noted that the embodiments are not constrained to a predetermined number of database tables and that there may be more or less database tables than what is shown in FIG. 3.

The commit metadata table 302 contains an entry or row for each commit. Each entry in the commit metadata table 302 may include a commit identifier, (i.e., COMMIT ID), that uniquely identifies a commit, a comment field, (i.e., COMMENT), that is user input and may be descriptive or non-descriptive, and the author of the commit (i.e., AUTHOR).

The commit change table 304 contains an entry or row for each commit. Each entry in the commit change table 304 includes a commit identifier (i.e., COMMIT ID), the path of the file changed in the commit (i.e., PATH), the type of change (i.e., CHANGE TYPE) that was made by the commit, and the time the commit was made (i.e. COMMIT TIME). The commit parent table 306 contains an entry or row for each commit. Each entry contains a commit identifier (i.e., COMMIT ID) and a parent identifier) i.e., PARENT ID).

Figure 4:
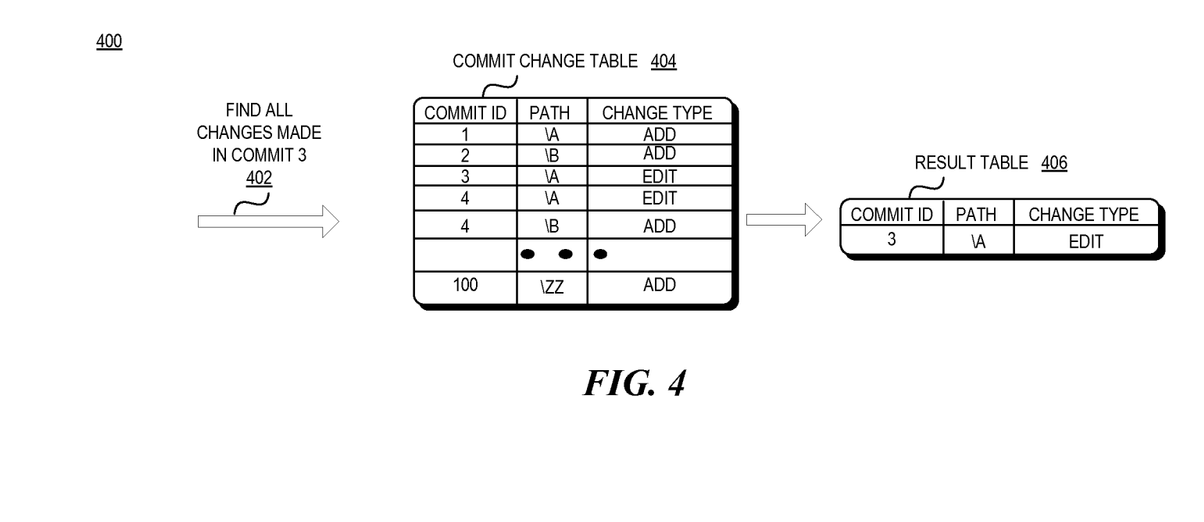
FIG. 4 is a block diagram illustrating a first exemplary query relating to particular changes.
Figure 5:
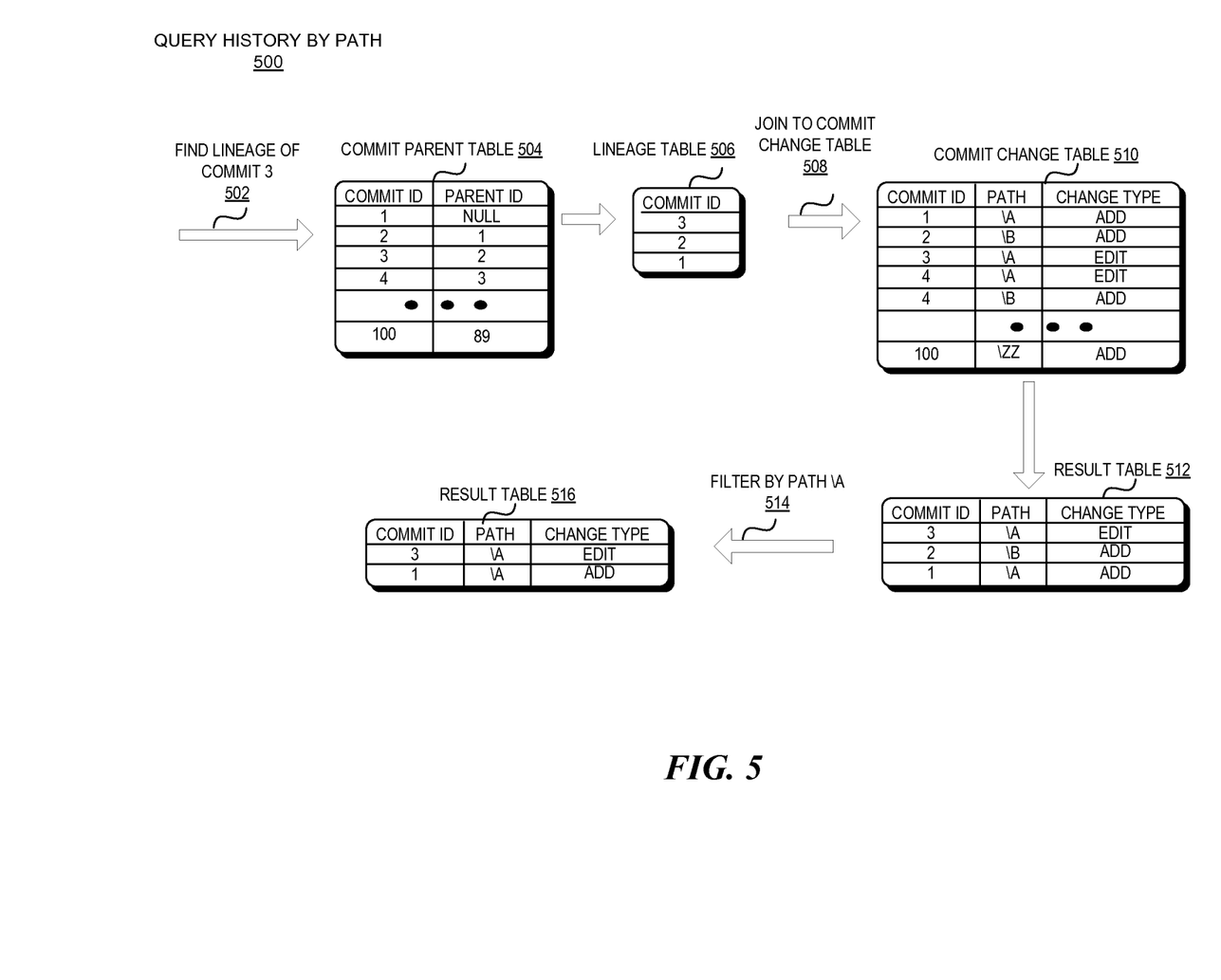
FIG. 5 is a block diagram illustrating a second exemplary query relating to a history of changes

The configuration of the set of commit manifest database tables enables queries to be implemented as database searches which are performed quickly without relying on costly tree traversal techniques. FIGS. 4-6 illustrate exemplary queries. FIG. 4 illustrates a query that obtains the changes made at a particular commit FIG. 5 illustrates a query that determines the history of revisions made to a file in a given path within the repository. FIG. 6 illustrates a query that determines the last commit made that contains changes made to each file in the repository.

In one or more embodiments, the databases tables are configured as relational databases that may be accessed through the structured query language (SQL). SQL provides a means to store, query, and manipulate data stored in tables. Although, the embodiments are described herein with respect to SQL, other query languages may be used. The embodiments are not limited in this manner.

FIG. 4 illustrates an exemplary query 400 seeking the changes made to the repository during commit 3, shown in the set of commit manifest 300 in FIG. 3. The central version control module in the server 102 formats a query 402 that is applied to the commit change table 404 to find all the changes made in commit 3. The results of the query are produced in result table 406 which includes file A (i.e., path=\A) which was edited (i.e., change type=edit). A query to a database in the manner shown in FIG. 4 is made with one query rather a tree traversal through a DAG representing a large repository of files.

FIG. 5 illustrates an exemplary query 500 used to find the history of changes made to path \A from commit 3. In this illustration, the file is referred to by its path name in order to distinguish the file from other files that may have the same file name. A query 502 is made to the commit parent table 504 for the lineage of commit 3 and the results are placed in lineage table 506. A join operation 508 is performed with respect to the lineage table 506 and the commit change table 510 and the results are placed in result table 512. The results in result table 512 shows commit 1 having path \A, commit 2 having path \B, and commit 1 having path \A. A filter operation 514 is performed on results table 512 to filter out the paths that do not match path \A and the results are placed in result table 516. Result table 516 contains commits 1 and 3. Result table 516 contains the history of \A which shows that path \A was added in commit 1 and then edited in commit 3.

Figure 6A:
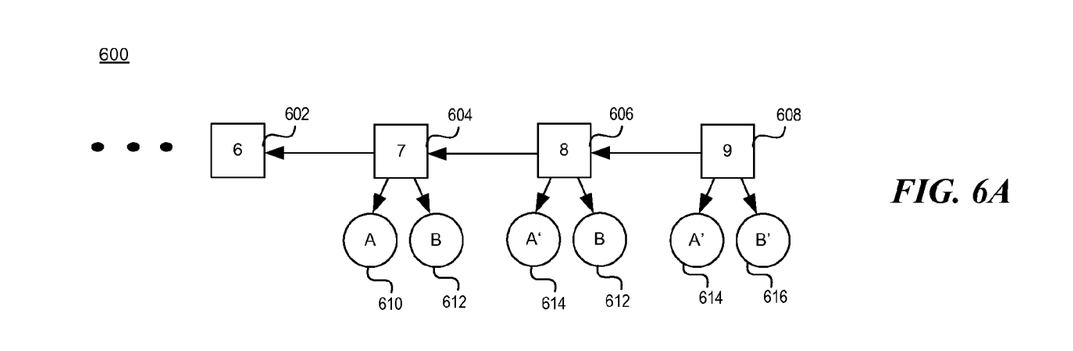
FIGS. 6A-6B are block diagrams illustrating a third exemplary query that finds the last commit of a file.

FIG. 6A shows a sequence of commits 600 including commits 6-9. Commit 6, 602, does not have a subtree. Commit 7, 604, has a subtree with file A, 610, and file B, 612. Commit 8, 606, has a subtree having the edited version of file A', 614, and file B, 612. Commit 9, 608, has a subtree having the edited file A', 614, and the edited file B', 616.

Figure 6B:
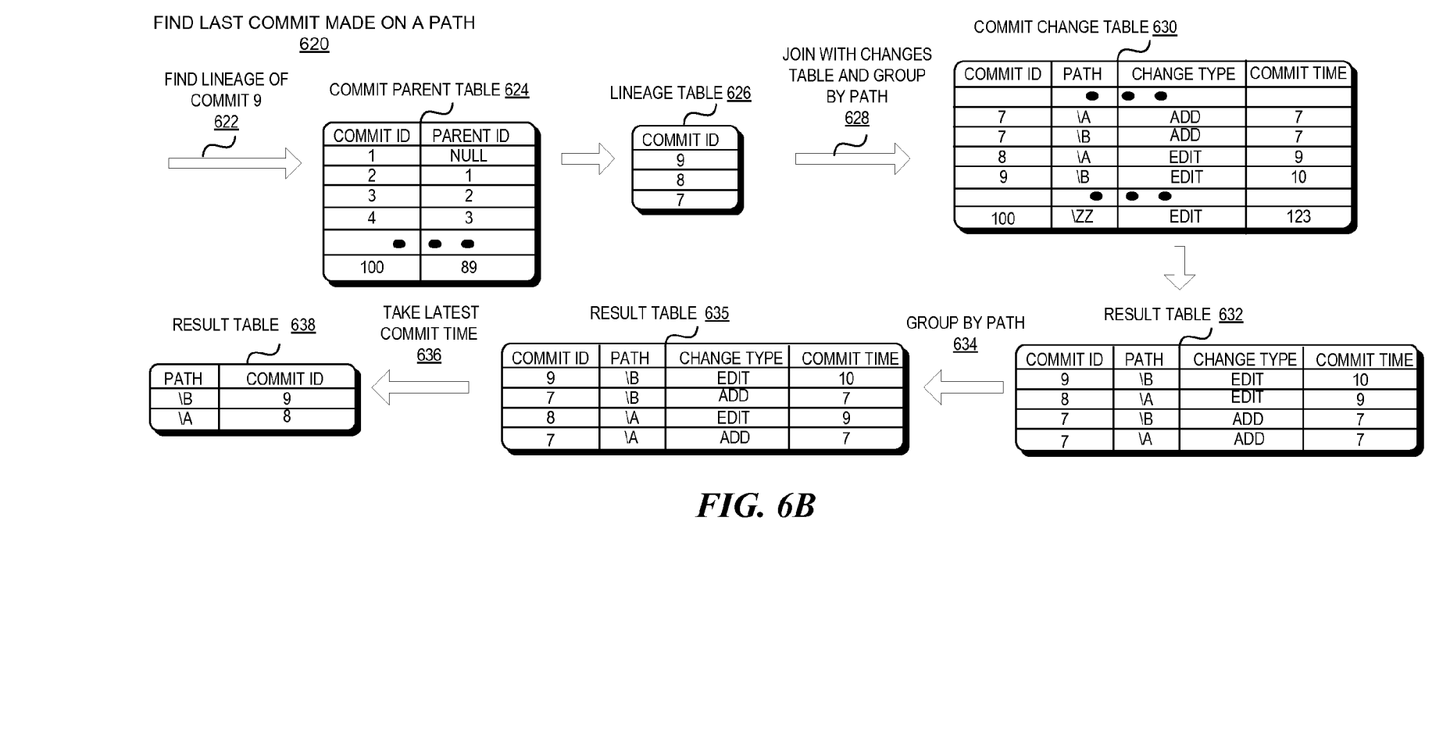

FIG. 6B illustrates an exemplary query 620, used on the sequence of commits 600, to find the last commit containing a change for each child. The query starts by finding the lineage of commit 9, 622 by using the commit parent table 624. The results are placed in lineage table 626 which shows commits 7, 8, and 9. A join operation 628 is performed with the lineage table 626 and commit change table 630 to find all changes made for the commits in the lineage table. The results are placed in result table 632. Another operation 634 is performed on the result table 632 to group the commits by path which is shown in result table 635. The commits with the latest time are then extracted 636 and placed in result table 638. The results show \B having been changed last at commit 9 and file \A having been changed last at commit 8.

Attention now turns to a discussion of the various exemplary methods. It may be appreciated that the representative methods do not necessarily have to be executed in the order presented, or in any particular order, unless otherwise indicated. Moreover, various activities described with respect to the methods can be executed in serial or parallel fashion, or any combination of serial and parallel operations. The methods can be implemented using one or more hardware elements and/or software elements of the described embodiments or alternative embodiments as desired for a given set of design and performance constraints. For example, the methods may be implemented as logic (e.g., computer program instructions) for execution by a logic device (e.g., a general-purpose or specific-purpose computer).

Figure 7:
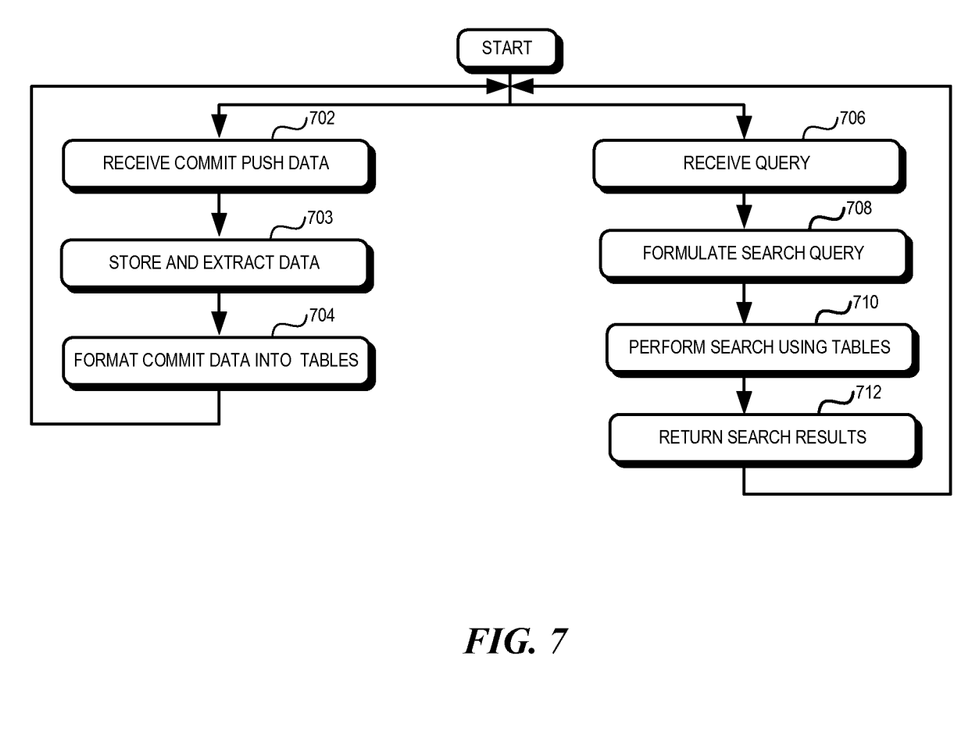
FIG. 7 is a flow diagram illustrating an exemplary method for operating a centralized version control system.

FIG. 7 illustrates a method for operating a centralized version control system. The server 102 of the centralized version control system 104 receives a commit push data message including one or more commits that were made and stored locally on a client machine (block 702). The centralized version control module 110 stores the data from the commit push message and then extracts the data (block 703) so that the data is formatted into one or more of the database tables (block 704).

The server 102 of the centralized version control system 104 may also receive a query relating to the versions stored in the central repository 112 (block 706). The central version control module 110 formats one or more search queries to obtain the information in one or more of the database tables (block 708) and performs the searches using the database tables (block 710). The search results are then formatted into a response which is returned to the client machine that submitted the query (block 712).

Figure 8:
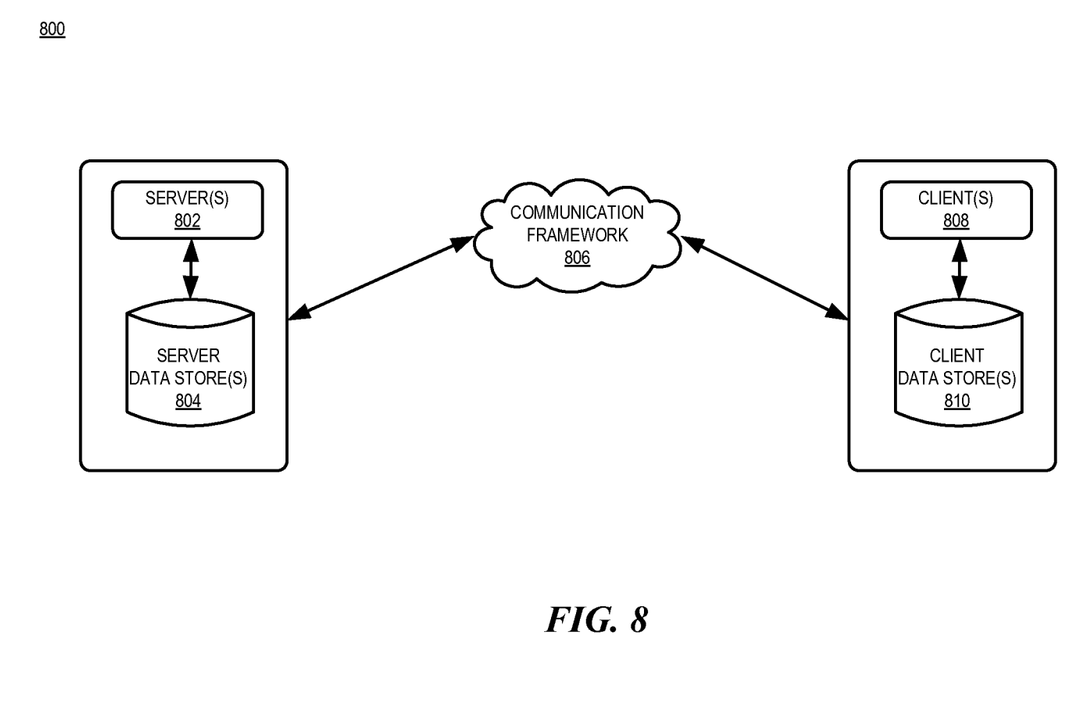
FIG. 8 is a block diagram illustrating an exemplary operating environment.

Attention now turns to a discussion of an exemplary operating environment. Referring now to FIG. 8, there is shown a schematic block diagram of an exemplary operating environment 800. The embodiments may be applied to an operating environment 800 having one or more servers 802A-802N ("802") communicatively coupled through a communication framework 806 to one or more clients ("808"). It should be noted that the operating environment 800 is exemplary and is not intended to suggest any limitation as to the functionality of the embodiments. In one or more embodiments, a server 802 may be server 102 and the clients 808 may be the client machines 108.

Each server 802 may be communicatively coupled to one or more server data stores 804. A server 802 may be embodied as a hardware device, a software module, or a combination thereof. The server 802 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. The server 802 may also be embodied as a software module having instructions that execute in a single execution path, multiple concurrent execution paths (e.g., thread, process, etc.), or in any other manner.

Each client 808 may be embodied as a hardware device, a software module, or a combination thereof. A client 808 may be any type of electronic device, such as, without limitation, a mobile device, a personal digital assistant, a mobile computing device, a tablet, a smart phone, a cellular telephone, a handheld computer, a server, a server array or server farm, a web server, a network server, a blade server, an Internet server, a work station, a mini-computer, a mainframe computer, a supercomputer, a network appliance, a web appliance, a distributed computing system, multiprocessor systems, or combination thereof. A client 808 may also be embodied as a software module having instructions that execute in a single execution path, multiple concurrent execution paths (e.g., thread, process, etc.), or in any other manner.

The communication framework 806 facilitates communications between the servers and the clients. The communication framework 806 may embody any well-known communication techniques, such as techniques suitable for use with packet-switched networks (e.g., public networks such as the Internet, private networks such as enterprise intranet, and so forth), circuit-switched networks (e.g., the public switched telephone network), or a combination of packet-switched networks and circuit-switched networks (with suitable gateways and translators).

Each server 802 and client 808 may include various types of standard communication elements designed to be interoperable with the communication framework 806, such as one or more communications interfaces, network interfaces, network interface cards, radios, wireless transmitters/receivers, wired and/or wireless communication media, physical connectors, and so forth. Examples of wired communications media may include a wire, cable, metal leads, printed circuit boards, backplanes, switch fabrics, semiconductor material, twisted-pair wire, coaxial cable, fiber optics, a propagated signal, and so forth. Examples of wireless communications media may include acoustic, radio frequency spectrum, infrared, and other wireless media.

Figure 9:
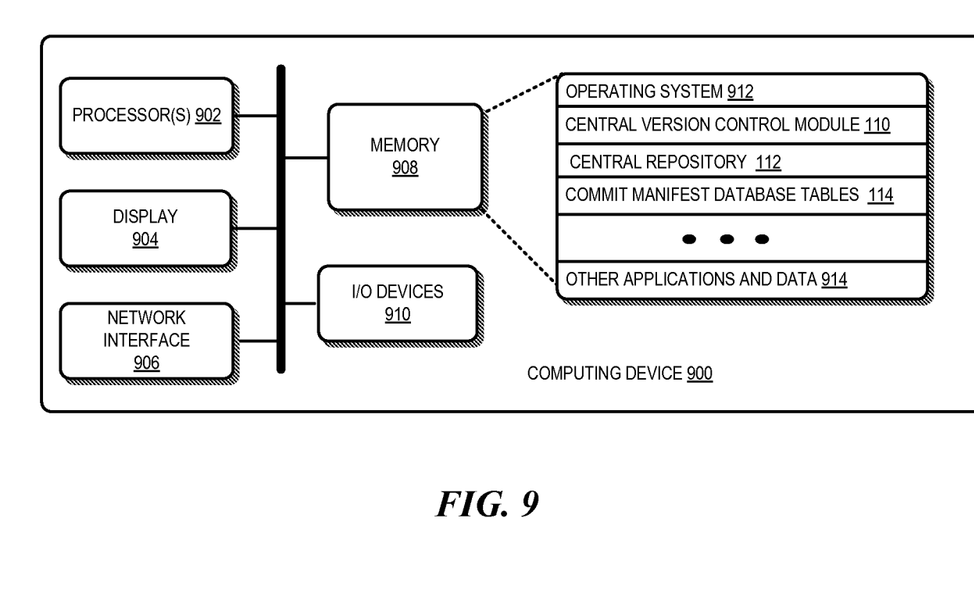
FIG. 9 is a block diagram illustrating an exemplary computing device used in the operating environment.

FIG. 9 illustrates an exemplary computing device that may be used as server 102. The computing device 900 may have one or more processors 902, a display 904, a network interface 906, a memory 908, and one or more input/output (I/O) devices 910. A processor 902 may be any commercially available processor and may include dual microprocessors and multi-processor architectures. The display 904 may be any visual display unit and it may be embedded within a computing device or physically separated from it. The network interface 906 facilitates wired or wireless communications between the computing device 900 and a communication framework. The I/O devices 910 may include a keyboard, mouse, pointing device, microphone, other devices to receive voice input, touch screen input, devices to accept gesture input, and the like.

The memory 908 may be any type of computer-readable storage media or computer-readable storage device that stores executable procedures, applications, and data. The memory 908 may be implemented as a memory device (e.g., random access memory, read-only memory, etc.), magnetic storage, volatile storage, non-volatile storage, optical storage, DVD, CD, floppy disk drive, flash drive, and so forth and any combination thereof. The computer-readable storage media does not pertain to propagated signals, such as modulated data signals transmitted through a carrier wave. The memory 908 may also include one or more external storage devices or remotely located storage devices. The memory 908 may contain instructions and data as follows:

an operating system 912;
    a central version control module 110;
    a central repository 112;
    commit manifest database tables 114; and
    various other applications and data 914.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A computer-implemented method, the method comprising:
    receiving, at a centralized version control system, a commit push message, the commit push message representing a time-ordered sequence of one or more commits made to a repository of files stored in the centralized version control system, a commit representing a configuration of the repository at a particular point in time;
    extracting data from the commit push message into one or more database tables stored in the centralized version control system;
    receiving a query relating to one or more versions of one or more files within the repository; and
    accessing the one or more database tables to obtain data in response to the query,
    wherein the one or more database tables track changes made to the repository in a time-ordered sequence.

2. The method of claim 1, further comprising:
    receiving the commit push message from a client machine communicatively coupled to a server machine receiving the commit push message.

3. The method of claim 1, wherein the one or more database tables include a commit metadata table having at least one commit describing one or more of a commit identifier, a time reference, and an author associated with the at least one commit.

4. The method of claim 1, wherein the one or more database tables include a commit change table including at least one change made to the repository in a corresponding commit.

5. The method of claim 1, wherein the one or more database tables include a commit parent table including at least one commit and an identifier of an associated parent commit.

6. The method of claim 4, further comprising:
querying the commit change database table to find one or more changes made in the corresponding commit.

7. The method of claim 1, further comprising:
querying a commit parent table to find a lineage of a file associated with a first commit;
using the lineage to query a commit change table for all changes associated with commits in the lineage; and
filtering out from the commits in the lineage, pathnames that do not match a pathname associated with the file to obtain a history of all changes made to the file.

8. The method of claim 1, further comprising:
querying a commit parent table to find a lineage for a first commit;
using the lineage to query a commit changes table for all commits associated with the commits in the lineage;
grouping the commits by pathname; and
searching within the grouping for changes having a latest commit time.

9. The method of claim 1, wherein the one or more database tables are configured as structure query language (SQL) database tables.

10. A computer-implemented system, comprising:
at least one processor, a memory, a repository of files, and one or more database tables,
the memory having a version control module, including processor executable instructions that when executed on the at least one processor:
receives, at a centralized version control system, one or more commit push messages;
extracts information from at least one commit push message into the one more database tables stored in the centralized version control system; and
performs, at the centralized version control system, database queries on the one or more database tables to obtain data relating to one or more versions of the repository,
wherein the commit push message represents a time-ordered sequence of one or more commits made to the repository of files, a commit representing a configuration of the repository at a particular point in time, and
wherein the one or more database tables track changes made to the repository in a time-ordered sequence.

11. The computer-implemented system of claim 10, further comprising:
a commit change database table including at least one change made in at least one commit; and
wherein the version control module comprises processor-executable instructions that when executed on the at least one processor, queries the commit change database table to find one or more changes made by a commit.

12. The computer-implemented system of claim 10, further comprising:
a commit parent database table identifying a parent of a commit;
a commit change database table including at least one change made in at least one commit; and
wherein the version control module comprises processor-executable instructions that when executed on the at least one processor, queries the commit parent database table to find a lineage for a commit, uses the lineage to query a commit change database table for changes associated with the lineage, and filters out from the commits associated with the lineage, pathnames of files that do not match a requested pathname.

13. The computer-implemented system of claim 10, further comprising:
a commit parent database table identifying a parent for a commit;
a commit change database table including at least one change made at in at least one commit; and
wherein the version control module comprises processor-executable instructions that when executed on the at least one processor, queries a commit parent database table to find a lineage for a commit, uses the lineage to query a commit changes database table to find changes made with commits associated with the lineage, groups the changes by pathname, and searches within each group for the those changes having a latest commit time.

14. The computer-implemented system of claim 10, wherein at least one client machine has a local version control module that performs version control locally and generates a sequence of commits to share a local version of the repository with other client machines.

15. A device, comprising:
at least one processor and a memory;
the at least one processor configured to:
maintain a central repository of files and a commit change database table;
store data from a commit push message received at the device into a commit change database table, the commit push message representing a time-ordered sequence of one or more commits made to the central repository of files, the commit change database table including the one or more commits and changes made to one or more files in the commit;
receive a query relating to one or more versions of one or more files within the repository; and
search the commit change database table to generate a response to the query.

16. The device of claim 15, wherein the at least one processor is further configured to:
query the commit change database table to find one or more changes made in a specific commit.

17. The device of claim 15, further comprising a commit parent database table that associates a commit with a parent commit.

18. The device of claim 17,
wherein the at least one processor is further configured to:
query the commit parent database table to find a lineage for a first commit;
use the lineage to query the commit change database table for all changes associated with the lineage; and
filter out from the commits associated with the lineage, files that do not match a requested file, in order to obtain a history of changes made to the requested file.

19. The device of claim 17,
wherein the query requests a last commit containing a change for a first file;
wherein the at least one processor is further configured to:
query a commit parent database table to find a lineage for a first commit;
use the lineage to query the commit changes database table to find all changes made with commits associated with the lineage;
group the changes by filename; and
search within the groups for the those changes having a latest commit time.

* * * * *